(12) United States Patent
Kekki

(10) Patent No.: US 10,270,659 B2
(45) Date of Patent: Apr. 23, 2019

(54) METHOD AND APPARATUS FOR APPLICATION BEHAVIOR POLICIES

(75) Inventor: Sami Johannes Kekki, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 293 days.

(21) Appl. No.: 14/398,822

(22) PCT Filed: May 21, 2012

(86) PCT No.: PCT/IB2012/052547
§ 371 (c)(1),
(2), (4) Date: Nov. 4, 2014

(87) PCT Pub. No.: WO2013/175267
PCT Pub. Date: Nov. 28, 2013

(65) Prior Publication Data
US 2015/0134789 A1 May 14, 2015

(51) Int. Cl.
*H04L 12/24* (2006.01)
*H04L 12/26* (2006.01)

(52) U.S. Cl.
CPC .......... *H04L 41/0893* (2013.01); *H04L 43/10* (2013.01)

(58) Field of Classification Search
CPC ........................... H04L 41/0893; H04L 43/10
See application file for complete search history.

(56) References Cited

U.S. PATENT DOCUMENTS 6,968,539 B1 * 11/2005 Huang ................. G06F 9/4484
717/115

7,069,330 B1 * 6/2006 McArdle ............. H04L 63/0227
709/223

(Continued)

FOREIGN PATENT DOCUMENTS

CN 101379757 A 3/2009
WO WO 2007/092573 A2 8/2007

(Continued)

OTHER PUBLICATIONS

Liabotis et al., "Policy-Based Resource Management for Application Level Active Networks", Second IEEE Latin American Network Operations and Management Symposium LANOMS, 2001, 11 pages.

(Continued)

*Primary Examiner* — Uzma Alam
(74) *Attorney, Agent, or Firm* — Alston & Bird LLP

(57) ABSTRACT

Various methods are described with respect to application behavior polices according to example embodiments. One example method may comprise determining an application behavior policy of one or more application behavior policies for an application, the application behavior policy comprising one or more configuration parameters. The method of this embodiment may also include causing the application to be launched, such that once launched the application operates in accordance with the application behavior policy. The method of this embodiment may also include causing the application to perform a negotiation with a remote peer, wherein the negotiation comprises a determination with respect to the one or more configuration parameters. The method of this embodiment may also include causing the application behavior policy to be enforced against the application.

20 Claims, 8 Drawing Sheets

(56) References Cited

U.S. PATENT DOCUMENTS

| | | | | | |
|---|---|---|---|---|---|
| 8,042,148 | B2* | 10/2011 | Andreasen | | H04L 63/0227 713/172 |
| 8,799,634 | B2* | 8/2014 | Courtney | | G06F 21/53 713/1 |
| 8,863,116 | B1* | 10/2014 | McCarten | | G06F 9/445 709/203 |
| 8,959,571 | B2* | 2/2015 | Dan | | H04L 41/0893 713/167 |
| 9,213,673 | B2* | 12/2015 | Lee | | G06F 15/167 |
| 2003/0005112 | A1* | 1/2003 | Krautkremer | | H04L 41/0213 709/224 |
| 2003/0021283 | A1* | 1/2003 | See | | H04L 41/0213 370/401 |
| 2004/0098446 | A1* | 5/2004 | Styles | | H04L 41/0866 709/200 |
| 2005/0005005 | A1* | 1/2005 | Styles | | G06F 21/575 709/223 |
| 2006/0059569 | A1* | 3/2006 | Dasgupta | | G06F 21/32 726/28 |
| 2006/0294219 | A1* | 12/2006 | Ogawa | | H04L 41/0893 709/224 |
| 2007/0226775 | A1* | 9/2007 | Andreasen | | H04L 63/0227 726/1 |
| 2007/0233448 | A1* | 10/2007 | Papaefstathiou | | G06F 17/5009 703/15 |
| 2008/0046963 | A1* | 2/2008 | Grayson | | H04L 12/66 726/1 |
| 2008/0128515 | A1* | 6/2008 | Di Iorio | | G06Q 20/341 235/492 |
| 2008/0162704 | A1* | 7/2008 | Poplett | | H04L 67/14 709/228 |
| 2008/0189760 | A1* | 8/2008 | Rosenberg | | G06F 21/10 726/1 |
| 2009/0288166 | A1* | 11/2009 | Brown | | G06F 21/51 726/23 |
| 2010/0144332 | A1* | 6/2010 | Savoor | | H04W 72/1242 455/418 |
| 2011/0239055 | A1* | 9/2011 | Busayarat | | G06F 11/3664 714/48 |
| 2011/0276661 | A1* | 11/2011 | Gujarathi | | G06F 9/452 709/219 |
| 2012/0158819 | A1* | 6/2012 | Anderson | | G06F 8/60 709/202 |
| 2012/0221955 | A1* | 8/2012 | Raleigh | | H04M 15/00 715/736 |
| 2012/0278722 | A1* | 11/2012 | Raleigh | | H04L 12/14 715/735 |
| 2012/0311154 | A1* | 12/2012 | Morgan | | H04L 12/6418 709/226 |
| 2013/0166899 | A1* | 6/2013 | Courtney | | G06F 21/53 713/100 |

FOREIGN PATENT DOCUMENTS

| | | | |
|---|---|---|---|
| WO | 2011100269 | A1 | 8/2011 |
| WO | 2011/149532 | A1 | 12/2011 |

OTHER PUBLICATIONS

Meyer et al., "Flexible Management of ANS Aware Applications", in the Third International Conference on Open Distributed Processing Experiences with distributed environments, 1995, 12 pages.

Extended European Search Report received for corresponding European Patent Application No. 12877113.6, dated Dec. 3, 2015, 7 pages.

"Advances to Ip Multimedia Subsystem (A-IMS) Architecture", International Telecommunication Union, Jun. 2006, pp. 1-268.

International Search Report and Written Opinion received for corresponding Patent Cooperation Treaty Application No. PCT/IB2012/052547, dated May 17, 2013, 11 pages.

Office Action for European Patent Application No. 12877113.6 dated Nov. 23, 2016, 7 pages.

Office Action for Chinese Patent Application No. 20128007370.7 dated Dec. 2, 2016, 35 pages.

Office Action for Chinese Patent Application No. 20128007370.7 dated Aug. 1, 2017, 33 pages.

Office Action for European Patent Application No. 12877113.6, dated Aug. 2, 2017, 7 pages.

Office Action for Chinese Application No. 201280073370.7, dated Apr. 3, 2018, 4 pages.

Office Action for European Patent Application No. 12877113.6, dated Mar. 23, 2018, 5 pages.

"AIMS" ITU-T Draft; Study Period 2005-2008, International Telecommunication Union, Geneva, CH, Vol. Study Group 13, (dated Nov. 13, 2006, pp. 1-268).

\* cited by examiner

METHOD AND APPARATUS FOR APPLICATION BEHAVIOR POLICIES

RELATED APPLICATION

This application was originally filed as PCT Application No. PCT/IB2010/0552547 filed May 21, 2012.

TECHNICAL FIELD

Embodiments of the present invention relate generally to communication technology, and, more particularly, relate to a method and apparatus for application behavior policy.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers (for example, mobile operators) are developing improvements to existing networks. In this regard, for example, improvements are being made to the universal mobile telecommunications system (UMTS) terrestrial radio access network (UTRAN). Further, for example, the evolved-UTRAN (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

Mobile operators and carriers are constantly adjusting to the growth of data traffic in their networks, communication device use and in particular smartphone use with various always-on applications and proliferation of high definition video are examples of aspects that have significantly impacted the amount of data in mobile operators' networks. At the same time, however, the average revenue earned by the networks on a per user basis is not following the average increase of traffic on a per user basis. This trend is creating affordability issues for the mobile operators; such as how to cover investments in capacity in the future.

In response to the aforementioned affordability issues, mobile operators may, for example, develop strategies for dealing with the data growth. Those strategies include, but are not limited to Wi-Fi offloading, deployment of smaller cells, different data packages that are better tailored for subscribers' needs, etc. As part of the offloading aspect of the strategy, operators may also consider offloading, such as offloading that 3rd Generation Partnership Project (3GPP) has defined as Access Network Discovery and Selection Function (ANDSF). ANDSF is configured to, for example, allow a mobile terminal operator to push down to the devices the policies guiding the device behavior with respect to how to use Wi-Fi access for offloading; what kind of services may be offloaded and to where and/or the like.

In some examples, besides using Wi-Fi offloading as the means for a mobile operator to reduce the pressure on their own cellular access, there are also available vendor specific solutions for preserving over-the-air bandwidth. These solutions are commonly described as application proxies. The example application proxy approach is either application specific or device operating system specific solution for reducing the effects of application keep-alive messages or for reducing the capacity taken by web browsing, for example, by compressing the traffic over the radio.

SUMMARY

Methods, apparatuses, and computer program products are herein provided for one or more application behavior policies that are configured to control the behavior of a given application or group of applications. In some example embodiments, the application behavior policies may comprise one or more validity conditions. The validity conditions may be configured to define one or more network conditions that represent an instance in which the application behavior policy is to be applied. The application behavior policies implement, in some example embodiments, application identifiers, such as those currently specified for ANDSF Inter-System Routing Policies (ISRP) to identify an application or group of applications. In some example embodiments, a task manager or equivalent entity operating within an operating system of a communication device, may be configured to identify an application via an application identifier and then cause the application to be launched subject to one or more configuration parameters of the application behavior polices. The task manager, the network or the like may further be configured to enforce or monitor the application behavior policy for the application or group of applications.

In some example embodiments, a method is provided that comprises determining an application behavior policy of one or more application behavior policies for an application, the application behavior policy comprising one or more configuration parameters. The method of this embodiment may also include causing the application to be launched, such that once launched the application operates in accordance with the application behavior policy. The method of this embodiment may also include causing the application to perform a negotiation with a remote peer. In some example embodiments, the negotiation comprises a determination with respect to the one or more configuration parameters.

In further example embodiments, an apparatus is provided that includes at least one processor and at least one memory including computer program code with the at least one memory and the computer program code being configured, with the at least one processor, to cause the apparatus to at least determine an application behavior policy of one or more application behavior policies for an application, the application behavior policy comprising one or more configuration parameters. The at least one memory and computer program code may also be configured to, with the at least one processor, cause the apparatus to cause the application to be launched, such that once launched the application operates in accordance with the application behavior policy. The at least one memory and computer program code may also be configured to, with the at least one processor, cause the apparatus to cause the application to perform a negotiation with a remote peer. In some example embodiments, the negotiation comprises a determination with respect to the one or more configuration parameters.

In yet further example embodiments, a computer program product may be provided that includes at least one non-transitory computer-readable storage medium having computer-readable program instructions stored therein with the computer-readable program instructions including program instructions configured to determine an application behavior policy of one or more application behavior policies for an application, the application behavior policy comprising one or more configuration parameters. The computer-readable program instructions may also include program instructions configured to cause the application to be launched, such that once launched the application operates in accordance with the application behavior policy. The computer-readable program instructions may also include program instructions configured to cause the application to perform a negotiation with a remote peer. In some example embodiments, the negotiation comprises a determination with respect to the one or more configuration parameters.

In yet further example embodiments, an apparatus is provided that includes means for determining an application behavior policy of one or more application behavior policies for an application, the application behavior policy comprising one or more configuration parameters. The apparatus of this embodiment may also include means for causing the application to be launched, such that once launched the application operates in accordance with the application behavior policy. The apparatus of this embodiment may also include means for causing the application to perform a negotiation with a remote peer. In some example embodiments, the negotiation comprises a determination with respect to the one or more configuration parameters.

In some example embodiments, a method is provided that comprises determining an application behavior policy of one or more application behavior policies for an application, the application behavior policy comprising one or more configuration parameters and one or more validity conditions. The method of this embodiment may also include determining that a validity condition of the application behavior policy of one or more application behavior policies has been met. The method of this embodiment may also include causing the application to be launched subject to the application behavior policy in an instance in which the application has not already been launched. The method of this embodiment may also include causing the application to be reconfigured such that it operates subject to the application behavior policy in an instance in which the application has already been launched.

In further example embodiments, an apparatus is provided that includes at least one processor and at least one memory including computer program code with the at least one memory and the computer program code being configured, with the at least one processor, to cause the apparatus to at least determine an application behavior policy of one or more application behavior policies for an application, the application behavior policy comprising one or more configuration parameters and one or more validity conditions. The at least one memory and computer program code may also be configured to, with the at least one processor, cause the apparatus to determine that a validity condition of the application behavior policy of one or more application behavior policies has been met. The at least one memory and computer program code may also be configured to, with the at least one processor, cause the apparatus to cause the application to be launched subject to the application behavior policy in an instance in which the application has not already been launched. The at least one memory and computer program code may also be configured to, with the at least one processor, cause the apparatus to cause the application to be reconfigured such that it operates subject to the application behavior policy in an instance in which the application has already been launched.

In yet further example embodiments, a computer program product may be provided that includes at least one non-transitory computer-readable storage medium having computer-readable program instructions stored therein with the computer-readable program instructions including program instructions configured to determine an application behavior policy of one or more application behavior policies for an application, the application behavior policy comprising one or more configuration parameters and one or more validity conditions. The computer-readable program instructions may also include program instructions configured to determine that a validity condition of the application behavior policy of one or more application behavior policies has been met. The computer-readable program instructions may also include program instructions configured to cause the application to be launched subject to the application behavior policy in an instance in which the application has not already been launched. The computer-readable program instructions may also include program instructions configured to cause the application to be reconfigured such that it operates subject to the application behavior policy in an instance in which the application has already been launched.

In yet further example embodiments, an apparatus is provided that includes means for determining an application behavior policy of one or more application behavior policies for an application, the application behavior policy comprising one or more configuration parameters and one or more validity conditions. The apparatus of this embodiment may also include means for determining that a validity condition of the application behavior policy of one or more application behavior policies has been met. The apparatus of this embodiment may also include means for causing the application to be launched subject to the application behavior policy in an instance in which the application has not already been launched. The apparatus of this embodiment may also include means for causing the application to be reconfigured such that it operates subject to the application behavior policy in an instance in which the application has already been launched.

In some example embodiments, a method is provided that comprises determining an application behavior policy for one or more applications, the application behavior policy comprising one or more configuration parameters. The method of this embodiment may also include causing the application behavior policy to be communicated to a communication device. The method of this embodiment may also include causing the application behavior policy to be enforced in an instance in which the one or more applications are launched.

In further example embodiments, an apparatus is provided that includes at least one processor and at least one memory including computer program code with the at least one memory and the computer program code being configured, with the at least one processor, to cause the apparatus to at least determine an application behavior policy for one or more applications, the application behavior policy comprising one or more configuration parameters. The at least one memory and computer program code may also be configured to, with the at least one processor, cause the apparatus to cause the application behavior policy to be communicated to a communication device. The at least one memory and computer program code may also be configured to, with the at least one processor, cause the apparatus to cause the application behavior policy to be enforced in an instance in which the one or more applications are launched.

In yet further example embodiments, a computer program product may be provided that includes at least one non-transitory computer-readable storage medium having computer-readable program instructions stored therein with the computer-readable program instructions including program instructions configured to determine an application behavior policy for one or more applications, the application behavior policy comprising one or more configuration parameters. The computer-readable program instructions may also include program instructions configured to cause the application behavior policy to be communicated to a communication device. The computer-readable program instructions may also include program instructions configured to cause the application behavior policy to be enforced in an instance in which the one or more applications are launched.

In yet further example embodiments, an apparatus is provided that includes means for determining an application behavior policy for one or more applications, the application behavior policy comprising one or more configuration parameters. The apparatus of this embodiment may also include means for causing the application behavior policy to be communicated to a communication device. The apparatus of this embodiment may also include means for causing the application behavior policy to be enforced in an instance in which the one or more applications are launched.

BRIEF DESCRIPTION OF THE DRAWING(S)

Having thus described some example embodiments of the invention in general terms, reference will now be made to the accompanying drawings, which are not necessarily drawn to scale, and wherein:

DETAILED DESCRIPTION

Figure 1:
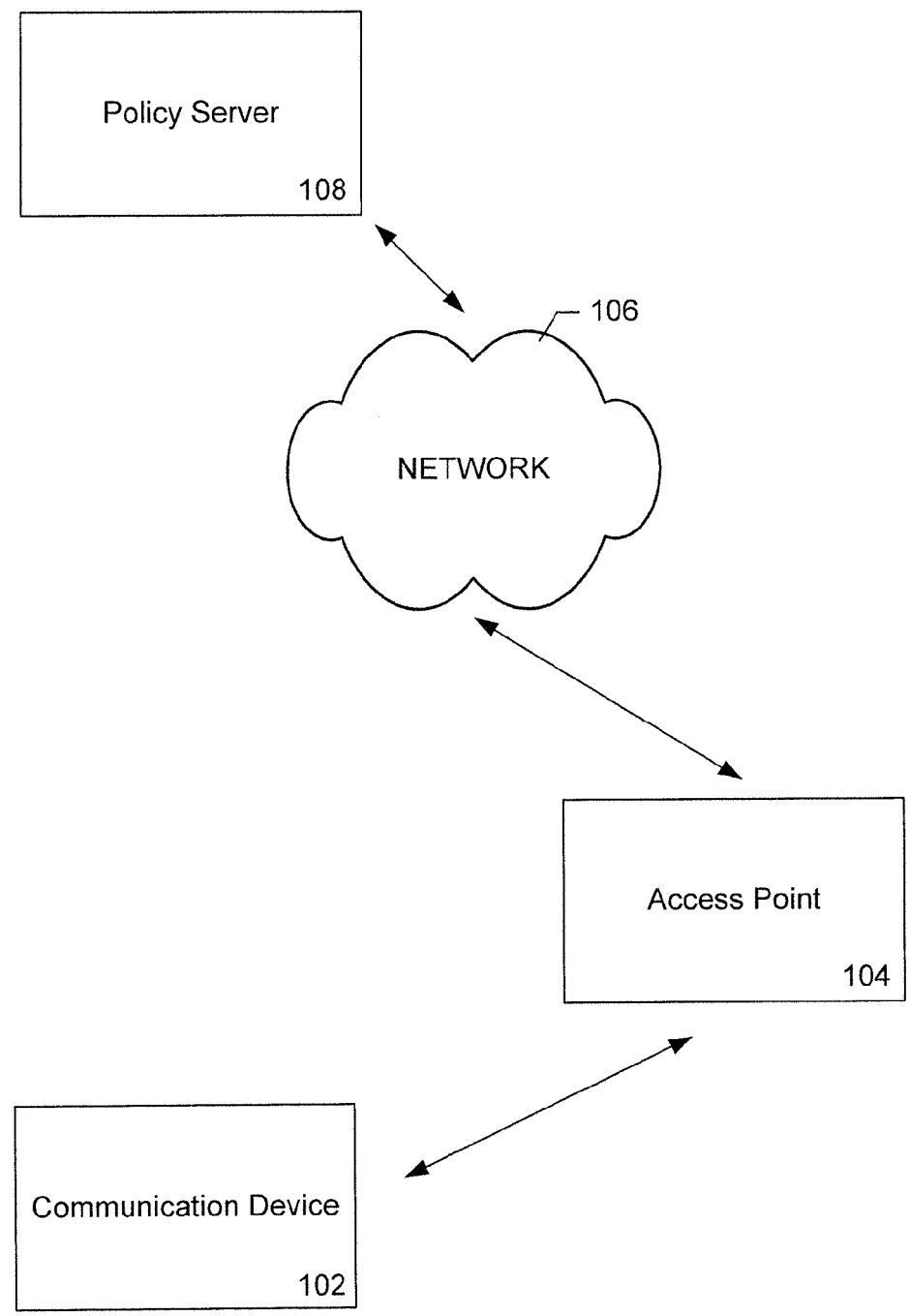
FIG. 1 illustrates a block diagram of a system for enabling one or more application behavior policies according to some example embodiments of the current invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry"

would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

In example embodiments described herein, one or more application behavior polices are configured to control and or influence applications operating on or in conjunction with a communications device. For example, applications that consume large amounts of network bandwidth may be regulated by the application behavior policies described herein. In some cases, the application behavior polices may be used in replacement of or in addition to policies regarding offloading data from a device.

The systems and methods described herein are configured, in some example embodiments, to enable a mobile operator of a network, access point or the like to alter the operations of applications either at the time the application is launched or based on a validity condition encountered in an instance in which the application is executing based on the application behavior policies described herein. In some example embodiments, a task manager may be configured to identify an application via application identifiers and further to initiate and/or launch the application based on an application behavior policy. The task manager may further be configured to control and/or influence applications, to include third party applications (for example, over the top applications), by enabling an application to negotiate one or more configuration parameters defined by the application behavior policy with an application peer (for example, an instance of the application on a server). Further, and in some example embodiments, a mobile operator may be configured to provide a financial charge, grant an application a lower priority on the network and/or ultimately block an application if the application does not comply with an application behavior policy.

Referring now to FIG. 1, FIG. 1 illustrates a block diagram of a system 100 for enabling application behavior policies according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for providing application behavior policies for one or more applications; numerous other configurations may also be used to implement embodiments of the present invention.

The system 100 may include one or more communication devices 102, one or more access points 104 and one or more policy servers 108. The system 100 may further comprise a network 106. The network 106 may comprise one or more wireline networks, one or more wireless networks, or some combination thereof. The network 106 may, for example, comprise a serving network (for example, a serving cellular network) for one or more communication devices 102. The network 106 may comprise, in certain embodiments, one or more of the communication devices 102, access points 104 and/or policy servers 108 themselves. The one or more policy servers 108, in some example embodiments, may be embodied by or included in the access point 104. According to example embodiments, the network 106 may comprise the Internet. In various embodiments, the network 106 may comprise a wired access link connecting one or more communication devices 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of 3GPP LTE (also referred to as LTE-A) standards, current and future implementations of International Telecommunications Union (ITU) International Mobile Telecommunications-Advanced (IMT-A) systems standards, wireless fidelity standards and/or the like. It will be appreciated, however, that where references herein are made to a network standard and/or terminology particular to a network standard, the references are provided merely by way of example and not by way of limitation.

According to various embodiments, one or more communication devices 102 may be configured to connect directly with one or more access points 104 via, for example, an air interface without routing communications via one or more elements of the network 106. Alternatively, one or more of the communication devices 102 may be configured to communicate with one or more of the access points 104 over the network 106. In this regard, the access points 104 may comprise one or more nodes of the network 106. For example, in some example embodiments, the access points 104 may be at least partially embodied on one or more computing devices that comprise an element of a radio access network (RAN) portion of the network 106. In this regard, the access points 104 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (for example, via a radio uplink) to one or more of the communication devices 102. In some embodiments, the access points 104 may comprise an ANDSF, and/or the like. Accordingly, each of the access points 104 may comprise a network node or a plurality of network nodes collectively configured to perform one or more operations attributed to the access point 104 as described with respect to various example embodiments disclosed herein.

A communication device 102 may be embodied as any computing device, such as, for example, a desktop computer, laptop computer, mobile terminal, mobile computer, mobile phone, smartphone, mobile communication device, tablet computing device, pad, game device, digital camera/camcorder, audio/video player, television device, radio receiver, digital video recorder, positioning device, wrist watch, portable digital assistant (PDA), fixed transceiver device (for example, attached to traffic lights, energy meters, light bulbs, and/or the like), a chipset, an apparatus comprising a chipset, any combination thereof, and/or the like.

In some example embodiments, a communication device 102 may be configured to control the behavior of one or more applications based on one or more application behavior policies. The application behavior policies may be received from a policy server 108 in conjunction with the access point 104 and the network 106. Alternatively or additionally, the application behavior policy may be generated and/or modified by the communication device 102.

In some example embodiments, the application behavior policy consists of one or more configuration parameters. The configuration parameters include, but should not be limited to, a maximum allowed bit rate for a variable rate application, a maximum coding scheme and/or resolution for an application to use for content coding, a limit for a keep alive interval between application peers or between the application on the client and an application on the server, information related to the availability of any given application proxy functionality that may be available in a given mobile operator's network (for example, internet protocol address of the proxy, fully qualified domain name (FQDN) of the proxy or a specific Access Point Name (APN) to be used for connecting with an application proxy).

In some example embodiments, an application or task manager operating on or in conjunction with the communication device 102 may enforce the behavior of the applications. Enforcement, as is described herein, generally refers to the monitoring of an application to ensure that the application abides by the application behavior policy. Alternatively or additionally, the enforcement function may reside with the access point 104, the network 106 and/or the policy server 108. By way of example, the access point 104 or the network 106 may apply different financial charging or different flow priority for those applications that follow the application behavior policy than for those applications that do not follow the policy. By way of further example and in an instance in which the network 106 experiences congestion, those flows or applications that do not follow the application policy may be pre-empted or de-prioritized earlier than the compliant applications. In some example embodiments the application behavior policies may be enforced against a communication device or a user of a communication device.

Figure 2:
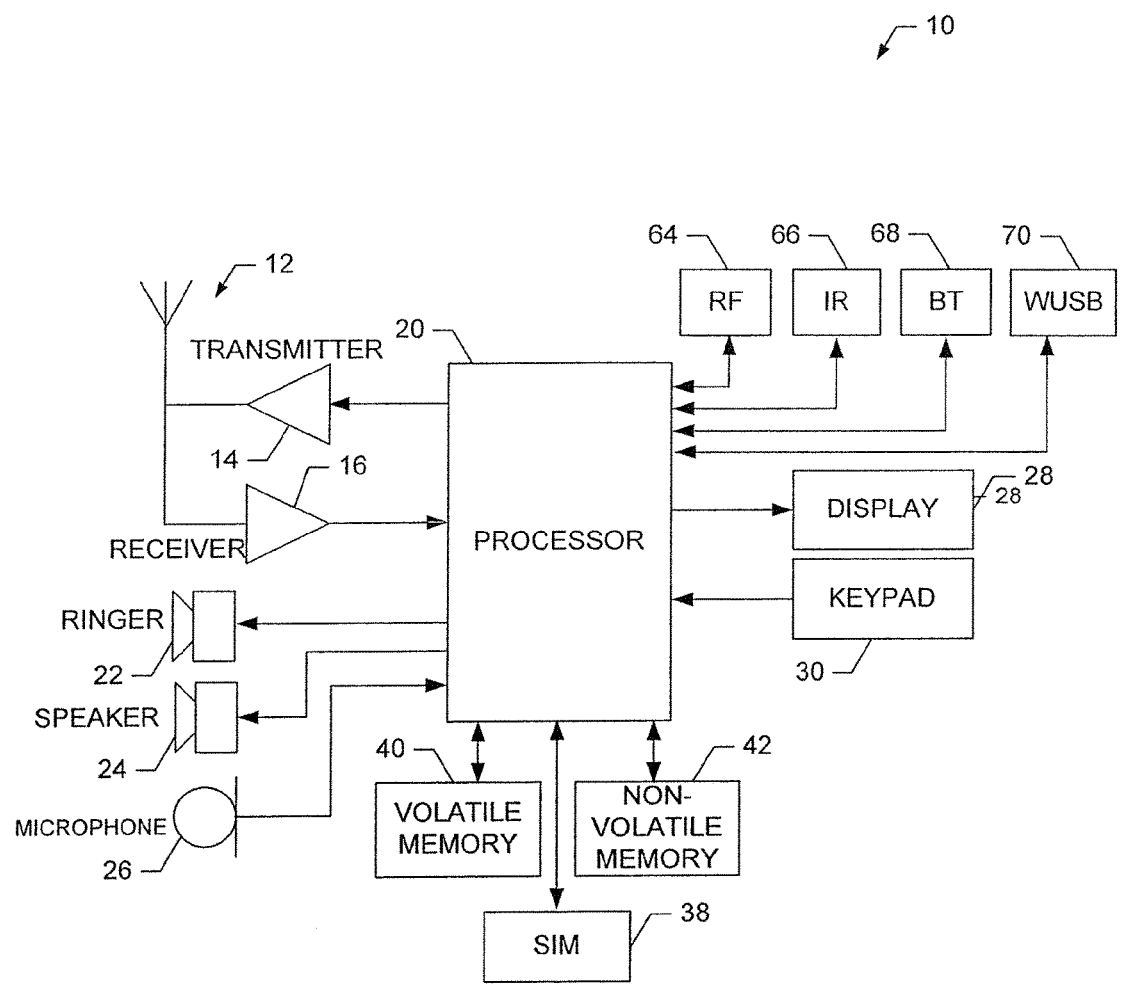
FIG. 2 illustrates a block diagram of a mobile terminal representative of one embodiment of a communications device.

In some example embodiments, a communication device 102 may be embodied as an example mobile terminal, such as that illustrated in FIG. 2. In this regard, FIG. 2 illustrates a block diagram of a mobile terminal 10 representative of one embodiment of a communication device 102. It should be understood, however, that the mobile terminal 10 illustrated and hereinafter described is merely illustrative of one type of computing device (for example, communication device 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various mobile communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as LTE or Evolved Universal Terrestrial Radio Access Network (E-UTRAN) and/or the like. Additionally, for example, the mobile terminal may be capable of operating in accordance with fourth-generation (4G) wireless communication protocols such as LTE-A and/or the like as well as similar wireless communication protocols that may be developed in the future. The mobile terminal may be capable in operating with various IEEE and IETF standards, for example IEEE 802.11 standard for wireless fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). The mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display, a trackpad, and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. The mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
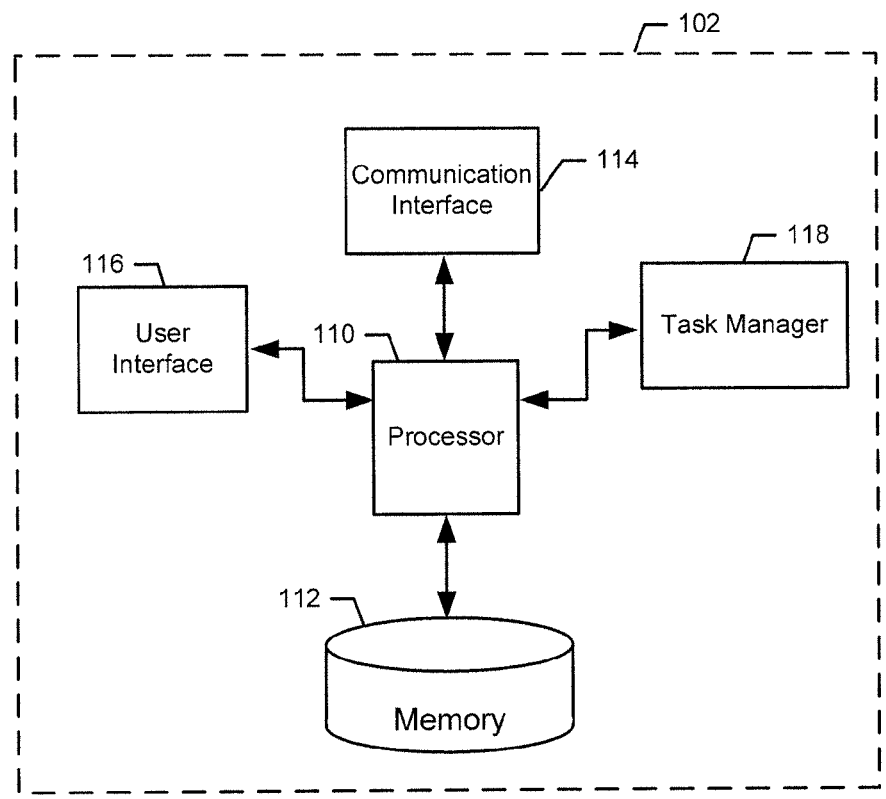
FIG. 3 illustrates a block diagram of a communication device according to some example embodiments of the current invention.

Referring now to FIG. 3, FIG. 3 illustrates a block diagram of a communication device 102 according to an example embodiment. In the example embodiment, the communication device 102 may comprise various means for performing the various functions herein described. These means may comprise one or more of a processor 110, memory 112, communication interface 114, user interface 116, and/or task manager 118. The means of the communication device 102 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example memory 112) that is executable by a suitably configured processing device (for example, the processor 110), or some combination thereof.

In some example embodiments, one or more of the means illustrated in FIG. 3 may be embodied as a chip or chip set. In other words, the communication device 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or task manager 118 may be embodied as a chip or chip set. The communication device 102 may therefore, in some example embodiments, be configured to implement embodiments of the present invention on a single chip or as a single "system on a chip." As another example, in some example embodiments, the communication device 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the communication device 102 as described herein. The plurality of processors may be embodied on a single computing device or distributed across a plurality of computing devices collectively configured to function as the communication device 102. In embodiments wherein the communication device 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the communication device 102 to perform one or more of the functionalities of the communication device 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the communication device 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the communication device 102 is embodied as a mobile terminal 10, the memory 112 may comprise the volatile memory 40 and/or the non-volatile memory 42. The memory 112 may be configured to store information, data, applications, instructions, or the like for enabling the communication device 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the task manager 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices, such as for example, an open mobile alliance (OMA) device management interface, a simple object access protocol (SOAP) extensible markup language (XML) interface or a client provisioning interface. In this regard, the communication interface 114 may be configured to receive and/or transmit data using any protocol that may be used for transmission of data over a wireless network, wireline network, some combination thereof, or the like by which the communication device 102 and one or more computing devices or computing resources may be in communication. As an example, the communication interface 114 may be configured to enable communication between the communication device 102 and another device, such as another communication device 102. As a further example, the communication interface 114 may be configured to enable communication with an access point 104 via the network 106. The communication interface 114 may additionally be in communication with the memory 112, user interface 116, and/or task manager 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a trackball, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or task manager 118, such as via a bus.

The task manager 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the task manager 118 is embodied separately from the processor 110, the task manager 118 may be in communication with the processor 110. The task manager 118 may further be in communication with one or more of the memory 112, communication interface 114, or user interface 116, such as via a bus.

Figure 4:
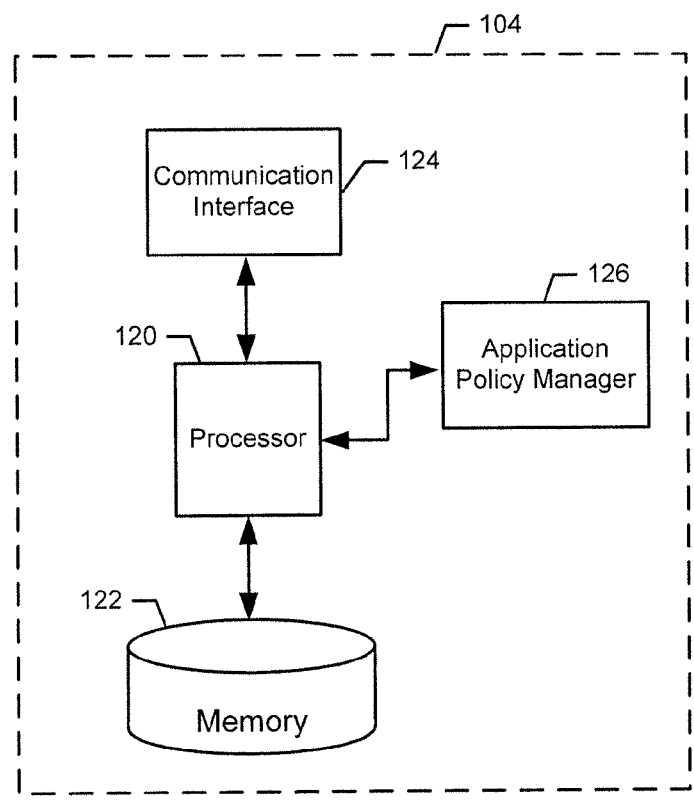
FIG. 4 illustrates a block diagram of an access point according to some example embodiments of the current invention.

Referring now to FIG. 4, FIG. 4 illustrates a block diagram of an access point 104 according to an example embodiment. In an example embodiment, the access point 104 may comprise various means for performing the various functions herein described. These means may comprise one or more of a processor 120, memory 122, communication interface 124, or application policy manager 126. The means of the access point 104 as described herein may be embodied as, for example, circuitry, hardware elements (for example, a suitably programmed processor, combinational logic circuit, and/or the like), a computer program product comprising computer-readable program instructions (for example, software or firmware) stored on a computer-readable medium (for example, memory 122) that is executable by a suitably configured processing device (for example, the processor 120), or some combination thereof.

In some example embodiments, one or more of the means illustrated in FIG. 4 may be embodied as a chip or chip set. In other words, the access point 104 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, and/or application policy manager 126 may be embodied as a chip or chip set. The access point 104 may therefore, in some example embodiments, be configured to implement embodiments of the present invention on a single chip or as a single "system on a chip." As another example, in some example embodiments, the access point 104 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 120 may comprise a plurality of processors. The plurality of processors may be in operative communication with each other and may be collectively configured to perform one or more functionalities of the access point 104 as described herein. The plurality of processors may be embodied on a single computing device or distributed across a plurality of computing devices collectively configured to function as the access point 104. In some example embodiments, the processor 120 may be configured to execute instructions stored in the memory 122 or otherwise accessible to the processor 120. These instructions, when executed by the processor 120, may cause the access point 104 to perform one or more of the functionalities of the access point 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the access point 104. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the access point 104 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the application policy manager 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/to another computing device. In an example embodiment, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the access point 104 and one or more computing devices or computing resources may be in communication. As an example, the communication interface 124 may be configured to enable communication with a communication device 102 by the network 106, a radio uplink, and/or the like. The communication interface 124 may additionally be in communication with the memory 122, and/or application policy manager 126, such as via a bus.

The application policy manager 126 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the application policy manager 126 may be embodied separately from the processor 120, the application policy manager 126 may be in communication with the processor 120. The application policy manager 126 may further be in communication with one or more of the memory 122 or communication interface 124, such as via a bus. Alternatively or additionally, the policy server 108 may be embodied by the application policy manager 126.

Figure 5:
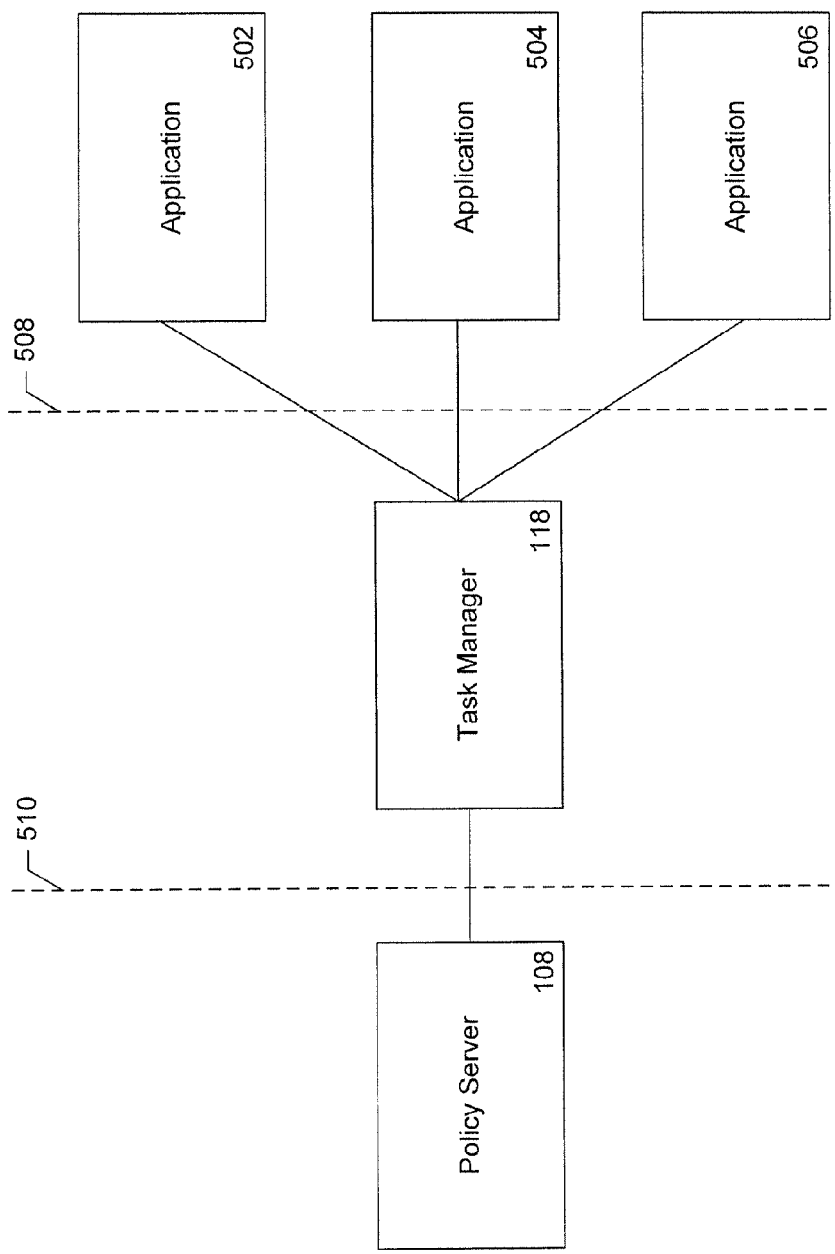
FIG. 5 illustrates an example block diagram of an application behavior policy system according to some example embodiments of the current invention.

FIG. 5 illustrates an example block diagram of an application behavior policy system according to some example embodiments of the current invention. In some example embodiments, a task manager 118 is configured to control one or more applications 502, 504 and 506 using one or more application behavior policies. In some cases, the task manager 118 may be configured to access the one or more applications via an application programming interface (API), such as API 508, that is configured to provide an interface between operating system operating on the communication device 102 and the applications 502, 504 and 506. Other interfaces provided by the operating system that are configured to initiate and/or control an application may also be used in some example embodiments.

In some example embodiments, the applications 502, 504 and 506 are identifiable by the task manager 118, based on application identifiers. As such the application behavior policy uses the application identifier to identify one or more applications. For example, the application identifiers may be used by the application behavior policy in a same or similar fashion as an application ID is used as a filter in a flow specific offloading policy that is described in Release 11 ISRP, which is hereby incorporated by reference. The application policy may then be applied to a single application or a group of applications.

Alternatively or additionally the application behavior policy may be included in a management object. A management object may include, but is not limited to, subscription information, access network discovery, inter-system mobility, inter-system routing, and/or the application behavior policy. In some example embodiments, the application behavior policy comprises one or more configuration parameters that take the form of general application parameters and apply to a group of applications and/or the communication parameters may take the form of application specific parameters that are specific to a particular application identifier.

In some example embodiments a task manager 118 may receive, such as via the communication interface 114, application behavior policies from the policy server 108. The interface between the policy server and the device can be an OMA-Device Management interface, a SOAP XML type of interface or any client provisioning interface that allows the policy server 108 or the like to push down application behavior policies to the device. The application behavior policies may then be stored by the communication device 102 in the memory 112. Alternatively or additionally, the application behavior polices may be pre-provisioned and stored in the memory 112. For example, the application behavior policies may be provided and/or updated by a mobile network provided prior to the use of the communication device 102.

Once, an application behavior policy is received, the task manager 118 may receive an indication, such as from the processor 110, that an application is to be launched. In an instance in which the application has an applicable application behavior policy defined, the task manager 118, such as via the processor 110 bootstraps or otherwise initiates the application such that the application behaves according to the application behavior policy. The application behavior policy may be applied by the processor 110, the task manager 118 or the like via API 508.

Alternatively or additionally, in some example embodiments, the application behavior policies may comprise one or more validity conditions. The validity conditions may be configured to define one or more network conditions that indicate an instance in which the application behavior policy is to be applied. As such, the task manager 118 may determine, such as from the processor 110, that a validity condition, such as a network condition, has occurred and thus cause the application behavior policy to be applied, such as by the processor 110, the task manager 118 or the like.

In an instance in which the task manager 118 has initiated or otherwise launched the application subject to the application behavior policy, the application, such as via the processor 110, the communication interface 114 or the like, the application may be configured to negotiate with its peer application (for example, application on the server) and/or an application proxy regarding the one or more configuration parameters (for example, bit rate(s), codec(s), coding scheme, keep-alive interval, etc.). For example, the application and peer application may negotiate a bit rate that complies with the application behavior policy.

In some example embodiments, the task manager 118, the access point 104, the network 106 or the policy server 108 may be configured to enforce and/or monitor the application behavior policy. In some examples, the task manager is configured to enforce the application behavior policy via the API 508. Alternatively or additionally, the network, such as via the application policy manager 126 of the access point 104, the network 106 or the policy server 108 may be configured to monitor application behavior with respect to the application behavior policy. Further, in an instance in which the application 502, 504, or 506 is compliant, a network priority may be increased or set higher than a predetermined threshold, such as by the application policy manager 126. The pre-determined threshold being a baseline priority assigned during attachment or the like. Alternatively or additionally, an application that is compliant may receive priority over a non-compliant application or a communication device that is controlling or executing a non-compliant application. Alternatively or additionally, in an instance in which the application 502, 504, or 506 is non-compliant, a network priority may be decreased or set lower than a predetermined threshold, such as by the application policy manager 126. Priority may be decreased in situations of network congestion or other non-normal network conditions. As described herein network congestion may include an instance in which a link or node is carrying so much data that its quality of service deteriorates.

In an instance in which application 502, 504, or 506 is non-compliant, the communication device 102, such as by the processor 110, the task manager 118 or the like may cause an indication to be displayed to a user interface 116 indicating that an application behavior policy has been overruled either by a user, the application or the like. Alternatively or additionally, the communication device 102, such as via the communication interface 114, may receive an indication that an application behavior policy has been violated, such as via a short message service message or the like.

In some example embodiments, a financial charge may be assessed against a non-compliant application. Alternatively or additionally, a compliant application may receive a reduction in charges based on compliance. In an instance in which application 502, 504, or 506 is non-compliant, the communication device 102, such as by the processor 110, the task manager 118 or the like may cause an indication to be displayed to a user interface 116 indicating that an application behavior policy has been overruled either by a user, the application or the like For example, in an instance in which the application uses high definition coding in streaming when the application behavior policy compliant behavior would be to use low quality normal definition coding). Alternatively or additionally, the communication device 102, such as via the communication interface 114, may receive an indication that an application behavior policy has been violated and a charge has been levied, such as via a short message service message or the like.

Figure 6:
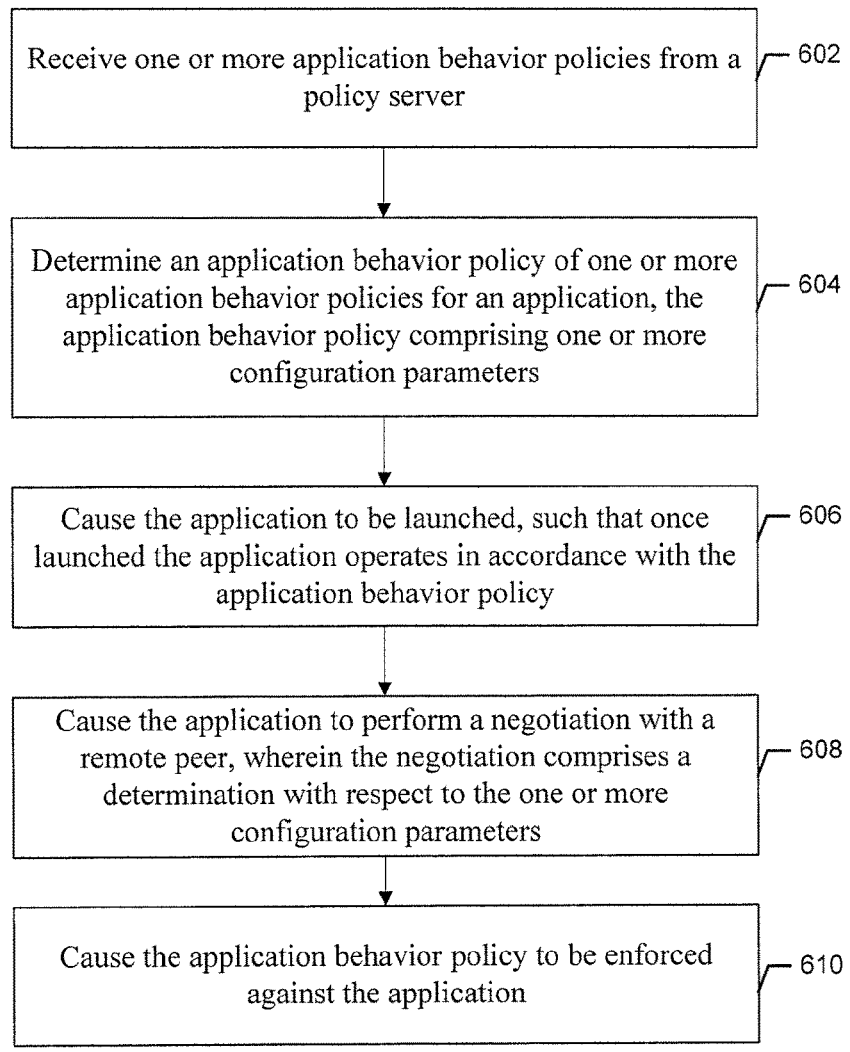
FIG. 6 illustrates a flowchart according to an example method configured to be executed by a communication device according to some example embodiments of the current invention.

FIG. 6 illustrates a flowchart according to an example method configured to be executed by a communications device for enabling application behavior polices. The operations illustrated in and described with respect to FIG. 6 may, for example, be performed by, with the assistance of, and/or under the control of one or more of the processor 110, memory 112, communication interface 114, or task manager 118. As is shown in operation 602, the communication device 102, may comprise means, such as the processor 110, the communications interface 114, the task manager 118, or the like, for receiving one or more application behavior policies from a policy server. In some example embodiments, the application behavior polices may be pre provisioned on the communications device 102.

As is shown in operation 604, the communication device 102, may comprise means, such as the processor 110, the task manager 118, or the like, for determining an application behavior policy of one or more application behavior policies for an application, the application behavior policy comprising one or more configuration parameters. In some example embodiments, the configuration parameters comprise at least one of a bit rate, a codec or a keep alive interval.

As is shown in operation 606, the communication device 102, may comprise means, such as the processor 110, the task manager 118, or the like, for causing the application to be launched, such that once launched the application operates in accordance with the application behavior policy. In some example embodiments, the application is identified by an application identifier based on an access network discovery and selection function inter-system routing policy.

As is shown in operation 608, the communication device 102, may comprise means, such as the processor 110, the communications interface 114, the task manager 118, or the like, for causing the application to perform a negotiation with a remote peer, wherein the negotiation comprises a determination with respect to the one or more configuration parameters. As is shown in operation 610, the communication device 102, may comprise means, such as the processor 110, the task manager 118, or the like, for causing the application behavior policy to be enforced against the application. In some example embodiments, the application is caused to be launched and the application behavior policy is caused to be enforced via one or more application programming interfaces.

Figure 7:
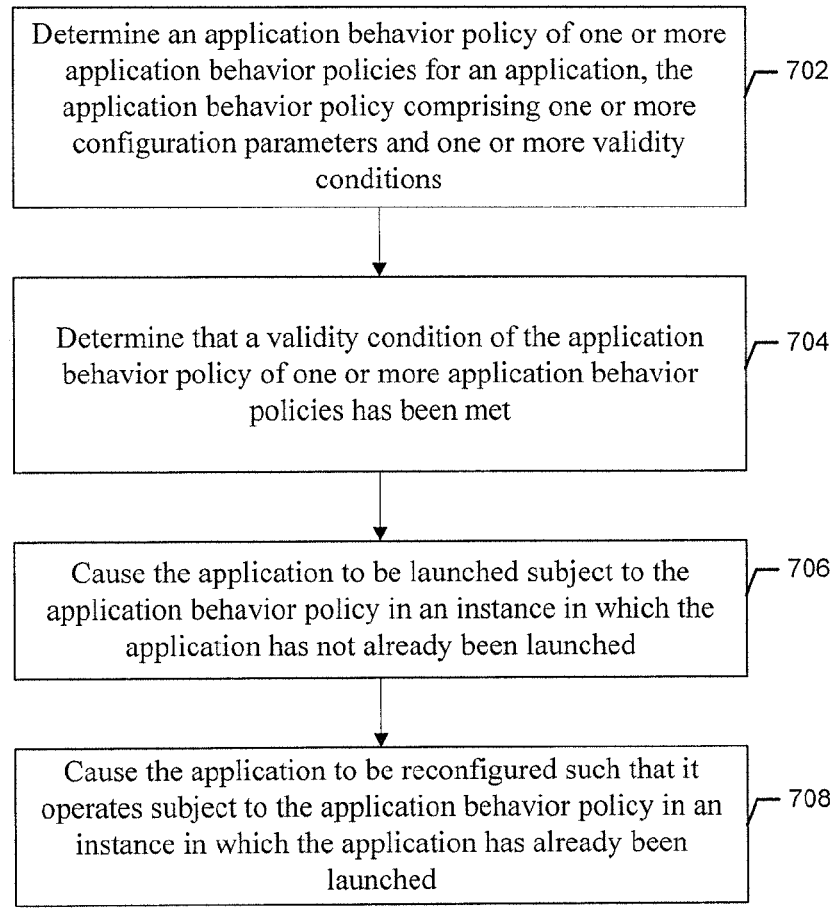
FIG. 7 illustrates a flowchart according to an example method configured to be executed by a communication device according to some example embodiments of the current invention.

FIG. 7 illustrates a flowchart according to an example method configured to be executed by a communications device for enabling application behavior polices based on one or validity conditions. The operations illustrated in and described with respect to FIG. 7 may, for example, be performed by, with the assistance of, and/or under the control of one or more of the processor 110, memory 112, communication interface 114, or task manager 118. As is shown in operation 702, the communication device 102, may comprise means, such as the processor 110, the task manager 118, or the like, for determining an application behavior policy of one or more application behavior policies for an application, the application behavior policy comprising one or more configuration parameters and one or more validity conditions.

As is shown in operation 704, the communication device 102, may comprise means, such as the processor 110, the task manager 118, or the like, for determining that a validity condition of the application behavior policy of one or more application behavior policies has been met. As is shown in operation 706, the communication device 102, may comprise means, such as the processor 110, the task manager 118, or the like, for causing the application to be launched subject to the application behavior policy in an instance in which the application has not already been launched. As is shown in operation 708, the communication device 102, may comprise means, such as the processor 110, the task manager 118, or the like, for causing Cause the application to be reconfigured such that it operates subject to the application behavior policy in an instance in which the application has already been launched.

Figure 8:
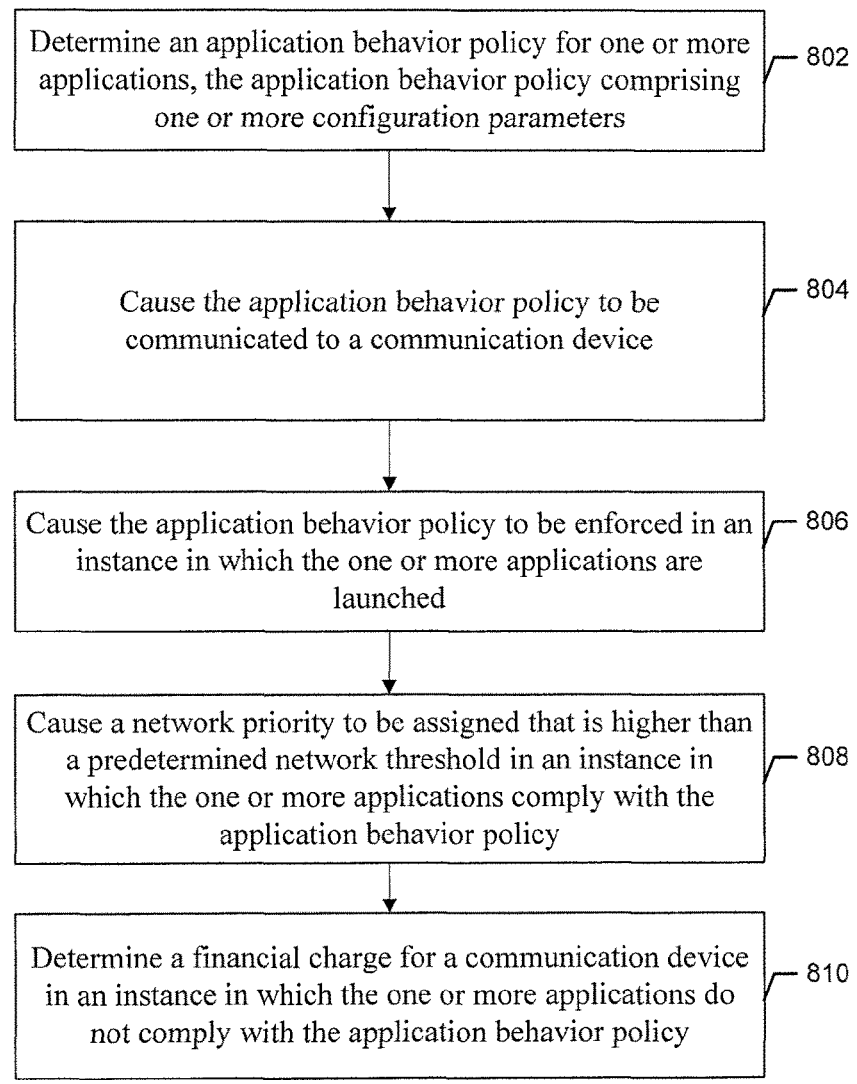
FIG. 8 illustrates a flowchart according to an example method configured to be executed by an access point according to some example embodiments of the current invention.

FIG. 8 illustrates a flowchart according to an example method configured to be executed by an access point for enabling application behavior polices. The operations illustrated in and described with respect to FIG. 7 may, for example, be performed by, with the assistance of, and/or under the control of one or more of the processor 120, memory 122, communication interface 124, or application policy manager 126. Alternatively or additionally, the example method described with respect to FIG. 8 may also be executed by or implemented on another network device, such as a policy server or the like. As is shown in operation 802, the access point 104, may comprise means, such as the processor 120 the application policy manager 126, or the like, for determining an application behavior policy for one or more applications, the application behavior policy comprising one or more configuration parameters.

As is shown in operation 804, the access point 104, may comprise means, such as the processor 120, the communications interface 124, the application policy manager 126, or the like, for causing the application behavior policy to be communicated to a communication device. As is shown in operation 806, the access point 104, may comprise means, such as the processor 120, the communications interface 124, the application policy manager 126, or the like, for causing the application behavior policy to be enforced in an instance in which the one or more applications are launched.

As is shown in operation 808, the access point 104, may comprise means, such as the processor 120, the communications interface 124, the application policy manager 126, or the like, for causing a network priority to be assigned that is higher than a predetermined network threshold in an instance in which the one or more applications comply with the application behavior policy. As is shown in operation 810, the access point 104, may comprise means, such as the processor 120, the application policy manager 126, or the like, for determining a financial charge for a communication device in an instance in which the one or more applications do not comply with the application behavior policy.

FIGS. 6-8 illustrate example flowcharts of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (for example, memory 112, memory 122, volatile memory 40, or non-volatile memory 42) of a mobile terminal, server, or other computing device (for example, the communication device 102, access point 104) and executed by a processor (for example, the processor 110, the processor 120 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowcharts' block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowcharts' block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In example embodiments, a suitably configured processor (for example, the processor 110 and/or processor 120) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 112 and/or memory 122), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
determining an application behavior policy of one or more application behavior policies for an application, the application behavior policy comprising one or more configuration parameters and one or more validity conditions, the one or more configuration parameters identifying particular conditions related to how the application is to be launched and operated, the one or more validity conditions identifying network conditions that represent one or more instances when the configuration parameters are to be applied;
determining that a validity condition of the application behavior policy has been met;
either
in an instance in which the application has not already been launched, causing the application to be launched subject to the application behavior policy and causing the application to perform a negotiation with a remote peer, wherein the negotiation comprises a determination with respect to one or more configuration parameters; or
in an instance in which the application has already been launched, causing the application to be reconfigured such that it operates subject to the application behavior policy;
enforcing the application behavior policy via one or more application programming interfaces; and
in an instance in which the application complies with the application behavior policy, causing a network priority to be assigned that satisfies a predetermined network threshold.

2. A method according to claim 1, further comprising:
causing the application to perform a negotiation with a remote peer, wherein the negotiation comprises a determination with respect to the one or more configuration parameters.

3. A method according to claim 1, further comprising:
causing the application behavior policy to be at least one of enforced or monitored against the application behavior.

4. A method according to claim 1, wherein the one or more configuration parameters comprise at least one of a bit rate, a codec, a coding scheme or a keep alive interval.

5. A method according to claim 1, wherein the application is identified by an application identifier.

6. A method according to claim 5, wherein the application identifier is based on an application identifier used in conjunction with an access network discovery and selection function inter-system routing policy.

7. A method according to claim 1, further comprising:
determining that a valid application policy has been overridden; and
causing a notification to be displayed indicating that the valid application policy has been overridden.

8. A method according to claim 1, further comprising:
receiving one or more application behavior policies from a policy server.

9. A method according to claim 8, wherein an interface with the policy server comprises at least one of an open mobile alliance device management interface, a simple object access protocol extensible markup language interface or a client provisioning interface.

10. A method according to claim 1, wherein the one or more application behavior polices are pre-provisioned and are configured to be accessed from a memory.

11. An apparatus comprising:
at least one processor; and
at least one memory including computer program code, the at least one memory and the computer program code configured to, with the at least one processor, cause the apparatus to at least:
determine an application behavior policy of one or more application behavior policies for an application, the application behavior policy comprising one or more configuration parameters and one or more validity conditions, the one or more configuration parameters identifying particular conditions related to how the application is to be launched and operated, the one or more validity conditions identifying network conditions that represent one or more instances when the configuration parameters are to be applied;
determine that a validity condition of the application behavior policy has been met;
either
in an instance in which the application has not already been launched, cause the application to be launched subject to the application behavior policy and cause the application to perform a negotiation with a remote user, wherein the negotiation comprises a determination with respect to one or more configuration parameters; or
in an instance in which the application has already been launched, cause the application to be reconfigured such that it operates subject to the application behavior policy;
enforce the application behavior policy via one or more application programming interfaces; and
in an instance in which the application complies with the application behavior policy, cause a network priority to be assigned that satisfies a predetermined network threshold.

12. An apparatus according to claim 11, wherein the at least one memory including the computer program code is further configured to, with the at least one processor, cause the apparatus to:
cause the application to perform a negotiation with a remote peer, wherein the negotiation comprises a determination with respect to the one or more configuration parameters.

13. An apparatus according to claim 11, wherein the at least one memory including the computer program code is further configured to, with the at least one processor, cause the apparatus to:
cause the application behavior policy to be at least one of enforced or monitored against the application behavior.

14. An apparatus according to claim 11, wherein the one or more configuration parameters comprise at least one of a bit rate, a codec, a coding scheme or a keep alive interval.

15. An apparatus according to claim 11, wherein the application is identified by an application identifier.

16. An apparatus according to claim 11, wherein the application identifier is based on an application identifier used in conjunction with an access network discovery and selection function inter-system routing policy.

17. An apparatus according to claim 11, wherein the at least one memory including the computer program code is further configured to, with the at least one processor, cause the apparatus to:
determine that a valid application policy has been overridden; and
cause a notification to be displayed indicating that the valid application policy has been overridden.

18. An apparatus according to claim 11, wherein the at least one memory including the computer program code is further configured to, with the at least one processor, cause the apparatus to:
receive one or more application behavior policies from a policy server.

19. An apparatus according to claim 18, wherein an interface with the policy server comprises at least one of an open mobile alliance device management interface, a simple object access protocol extensible markup language interface or a client provisioning interface.

20. A computer program product comprising:
at least one computer readable non-transitory memory medium having program code stored thereon, the program code which when executed by an apparatus cause the apparatus at least to:
determine an application behavior policy of one or more application behavior policies for an application, the application behavior policy comprising one or more configuration parameters and one or more validity conditions, the one or more configuration parameters identifying particular conditions related to how the application is to be launched and operated, the one or more validity conditions identifying network conditions that represent one or more instances when the configuration parameters are to be applied;
determine that a validity condition of the application behavior policy has been met;
either
in an instance in which the application has not already been launched, cause the application to be launched subject to the application behavior policy and cause the application to perform a negotiation with a remote user, wherein the negotiation comprises a determination with respect to one or more configuration parameters; or in an instance in which the application has already been launched, cause the application to be reconfigured such that it operates subject to the application behavior policy;

enforce the application behavior policy via one or more application programming interfaces; and in an instance in which the application complies with the application behavior policy, cause a network priority to be assigned that satisfies a predetermined network threshold.

* * * * *